(12) United States Patent
Amir

(10) Patent No.: US 12,523,761 B2
(45) Date of Patent: Jan. 13, 2026

(54) DEVICE FOR MONITORING AN ENVIRONMENT

(71) Applicant: Essence SmartCare Ltd., Herzeliya Pituach (IL)

(72) Inventor: Ohad Amir, Herzlia (IL)

(73) Assignee: Essence SmartCare Ltd., Herzeliya Pituach (IL)

( * ) Notice: Subject to any disclaimer, the term of this patent is extended or adjusted under 35 U.S.C. 154(b) by 565 days.

(21) Appl. No.: 17/790,494

(22) PCT Filed: Dec. 28, 2020

(86) PCT No.: PCT/IL2020/051336
§ 371 (c)(1),
(2) Date: Jun. 30, 2022

(87) PCT Pub. No.: WO2021/137215
PCT Pub. Date: Jul. 8, 2021

(65) Prior Publication Data
US 2023/0042452 A1    Feb. 9, 2023

(30) Foreign Application Priority Data
Dec. 31, 2019    (GB) .................................... 1919450

(51) Int. Cl.
*G01S 13/88*    (2006.01)
*G01P 13/00*    (2006.01)
(Continued)

(52) U.S. Cl.
CPC .............. *G01S 13/88* (2013.01); *G01P 13/00* (2013.01); *G01S 13/42* (2013.01); *G01S 13/86* (2013.01);
(Continued)

(58) Field of Classification Search
CPC .......... G01P 13/00; G01S 13/42; G01S 13/56; G01S 13/86; G01S 13/88; G01S 7/415;
(Continued)

(56) References Cited

U.S. PATENT DOCUMENTS

| 4,882,567 A | 11/1989 | Johnson |
| 7,463,182 B1 | 12/2008 | Morinaga et al. |

(Continued)

FOREIGN PATENT DOCUMENTS

| CN | 1670780 A | 9/2005 |
| CN | 108806190 A | 11/2018 |

(Continued)

OTHER PUBLICATIONS

Office Action dated Sep. 6, 2024 U.S. Appl. No. 17/790,495, filed Jun. 30, 2022.

(Continued)

*Primary Examiner* — Timothy A Brainard
(74) *Attorney, Agent, or Firm* — Conley Rose, P.C.

(57) ABSTRACT

A fall detector device (102) for mounting on a wall for monitoring an environment (100), comprising: a motion sensor (204) for detecting motion of a person (106) within a first field of view of the motion sensor; an active reflective wave sensor (206) for detecting the presence of a person within a second field of view of the active reflective wave sensor using wave reflections from the environment, the first and second fields of views at least partially overlapping one another, and a processor coupled to the motion sensor and active reflective wave sensor for receiving output from each of the motion sensor and active reflective wave sensor, wherein operation of the active reflective wave sensor is dependent on a detection of motion of a person within at least a portion of the first field of view by the motion sensor.

20 Claims, 6 Drawing Sheets

(51) Int. Cl.
*G01S 13/42* (2006.01)
*G01S 13/86* (2006.01)
*G08B 21/04* (2006.01)

(52) U.S. Cl.
CPC ....... *G08B 21/043* (2013.01); *G08B 21/0469* (2013.01); *G08B 21/0492* (2013.01)

(58) Field of Classification Search
CPC .............. G08B 13/2494; G08B 21/043; G08B 21/0469; G08B 21/0492
See application file for complete search history.

(56) References Cited

U.S. PATENT DOCUMENTS

| | | | |
|---|---|---|---|
| 7,567,200 B1 * | 7/2009 | Osterweil | G01S 13/56 342/28 |
| 7,893,844 B2 | 2/2011 | Gottlieb | |
| 7,916,066 B1 | 3/2011 | Osterweil | |
| 8,068,051 B1 | 11/2011 | Osterweil | |
| 8,742,935 B2 | 6/2014 | Cuddihy et al. | |
| 9,576,468 B2 | 2/2017 | Zack et al. | |
| 9,638,800 B1 | 5/2017 | Skowronek et al. | |
| 9,784,820 B2 | 10/2017 | Arage | |
| 9,824,570 B1 | 11/2017 | Skowronek et al. | |
| 9,921,309 B1 | 3/2018 | Skowronek et al. | |
| 10,226,204 B2 | 3/2019 | Heaton et al. | |
| 10,380,860 B2 | 8/2019 | Amir et al. | |
| 10,410,498 B2 | 9/2019 | Coke et al. | |
| 10,663,580 B2 | 5/2020 | Sakamaki et al. | |
| 10,901,069 B2 | 1/2021 | Otsuki et al. | |
| 10,929,653 B2 | 2/2021 | Yan et al. | |
| 11,074,800 B2 | 7/2021 | Li et al. | |
| 11,099,258 B2 | 8/2021 | Buddendick et al. | |
| 11,391,818 B2 | 7/2022 | Buddendick et al. | |
| 11,906,657 B2 | 2/2024 | Preece et al. | |
| 2006/0001545 A1 | 1/2006 | Wolf | |
| 2006/0145874 A1 | 7/2006 | Fredriksson et al. | |
| 2011/0032139 A1 | 2/2011 | Benitez et al. | |
| 2012/0116252 A1 | 5/2012 | Newman et al. | |
| 2013/0041856 A1 | 2/2013 | Benitez et al. | |
| 2013/0082842 A1 | 4/2013 | Balazs et al. | |
| 2014/0145848 A1 | 5/2014 | Amir | |
| 2014/0155729 A1 | 6/2014 | Saitoh | |
| 2014/0362213 A1 | 12/2014 | Tseng | |
| 2016/0267327 A1 | 9/2016 | Franz et al. | |
| 2016/0377704 A1 | 12/2016 | Harash et al. | |
| 2017/0074980 A1 | 3/2017 | Adib et al. | |
| 2017/0169691 A1 | 6/2017 | Kirenko et al. | |
| 2017/0328995 A1 | 11/2017 | Marschalkowski et al. | |
| 2018/0000385 A1 | 1/2018 | Heaton et al. | |
| 2018/0070889 A1 | 3/2018 | Lee et al. | |
| 2018/0137735 A1 | 5/2018 | Matsuoka et al. | |
| 2018/0192919 A1 | 7/2018 | Nakayama et al. | |
| 2018/0284223 A1 | 10/2018 | Otsuki et al. | |
| 2018/0292523 A1 * | 10/2018 | Orenstein | A61B 5/1113 |
| 2018/0314253 A1 | 11/2018 | Mercep et al. | |
| 2018/0330593 A1 | 11/2018 | Zack et al. | |
| 2019/0108740 A1 | 4/2019 | Coke et al. | |
| 2019/0108913 A1 | 4/2019 | Coke et al. | |
| 2019/0110741 A1 | 4/2019 | Ishii et al. | |
| 2019/0130725 A1 * | 5/2019 | Dempsey | G06V 20/52 |
| 2019/0313948 A1 | 10/2019 | Matsunaga et al. | |
| 2020/0116824 A1 * | 4/2020 | Yang | G01S 13/87 |
| 2020/0143656 A1 | 5/2020 | Li et al. | |
| 2022/0089237 A1 | 3/2022 | Sverdlov et al. | |
| 2023/0018686 A1 * | 1/2023 | Shin | A61B 5/747 |

FOREIGN PATENT DOCUMENTS

| | | |
|---|---|---|
| CN | 109239706 A | 1/2019 |
| CN | 109765552 A | 5/2019 |
| CN | 110179471 A | 8/2019 |
| CN | 110703241 A | 1/2020 |
| CN | 111166342 A | 5/2020 |
| CN | 112363160 A | 2/2021 |
| DE | 10024778 A1 | 11/2001 |
| EP | 0367402 A1 | 5/1990 |
| EP | 2533219 A1 | 12/2012 |
| EP | 2875500 A1 | 5/2015 |
| JP | H08220250 A | 8/1996 |
| JP | 2006153878 A | 6/2006 |
| JP | 2008220250 A | 9/2008 |
| JP | 2013149156 A | 8/2013 |
| JP | 2014106636 A | 6/2014 |
| JP | 2015082265 A | 4/2015 |
| JP | 2015138460 A | 7/2015 |
| JP | 2016192998 A | 11/2016 |
| JP | 2019158862 A | 9/2019 |
| WO | 2004014230 A1 | 11/2005 |
| WO | 2016155789 A1 | 10/2016 |
| WO | 2016193972 A2 | 12/2016 |
| WO | 2015083348 A1 | 3/2017 |
| WO | 2019070570 A1 | 4/2019 |
| WO | 2019231861 A1 | 12/2019 |
| WO | 2020223283 A1 | 11/2020 |
| WO | 2021118570 A1 | 6/2021 |
| WO | 2021137215 A1 | 7/2021 |
| WO | 2021137220 A2 | 7/2021 |
| WO | 2021137227 A2 | 7/2021 |

OTHER PUBLICATIONS

Office Action dated Sep. 23, 2024 U.S. Appl. No. 17/790,491, filed Jun. 30, 2022.
Foreign Communication From a Related Counterpart Application, International Search Report and Written Opinion dated Apr. 16, 2021, International Application No. PCT/IL2020/051336 filed on Dec. 28, 2020.
Foreign Communication from a Related Counterpart Application, Japanese Office Action dated Jul. 10, 2024, Japanese Patent Application No. 2022-540789 filed on Mar. 7, 2023.
Okuzumi, "5.6—Age-related changes in standing balance and falls in the elderly," Human measurement Handbook, First Edition, Sep. 1, 2003, pp. 793-798.
Foreign Communication from a Related Counterpart Application, Japanese Office Action dated Jan. 9, 2024, Japanese Patent Application No. 2022-540788 filed on Dec. 30, 2020.
Foreign Communication from a Related Counterpart Application, International Search Report and Written Opinion dated Jun. 28, 2021, International Application No. PCT/IL2020/051345 filed on Dec. 29, 2020.
Foreign Communication from a Related Counterpart Application, International Search Report and Written Opinion dated Aug. 3, 2021, International Application No. PCT/IL2020/051353 filed on Dec. 30, 2020.
Foreign Communication from a Related Counterpart Application, International Combined Search and Examination Report dated Sep. 13, 2021, Great Britain Application No. 2110780.0 filed on Jul. 27, 2021.
Foreign Communication from a Related Counterpart Application, Examination Report dated Oct. 29, 2021, Great Britain Application No. 2110780.0 filed on Jul. 27, 2021.
Foreign Communication from a Related Counterpart Application, International Combined Search and Examination Report dated Jun. 23, 2020, Great Britain Application No. 1919446.3 filed on Dec. 31, 2019.
Foreign Communication from a Related Counterpart Application, International Preliminary Report on Patentability dated Jul. 5, 2022, International Application No. PCT/IL2020/051353 filed on Dec. 30, 2020.
Foreign Communication from a Related Counterpart Application, International Combined Search and Examination Report dated Jun. 23, 2020, Great Britain Application No. 1919449.7 filed on Dec. 31, 2019.
Foreign Communication from a Related Counterpart Application, International Preliminary Report on Patentability dated Jul. 5, 2022, International Application No. PCT/IL2020/051345 filed on Dec. 29, 2020.

(56) References Cited

OTHER PUBLICATIONS

Foreign Communication from a Related Counterpart Application, International Combined Search and Examination Report dated Jun. 25, 2020, Great Britain Application No. 1919450.5 filed on Dec. 31, 2019.

Hevdeli, Ilan, et al., "Active Reflected Wave Monitoring," filed Jun. 30, 2022, U.S. Appl. No. 17/790,495.

Amir, Ohad, et al., "State Detection," filed Jun. 30, 2022, U.S. Appl. No. 17/790,491.

A Patentseekers Patentability Search Report that was prepared for UK application GB1919449.7 which corresponds to U.S. Appl. No. 17/790,491.

Foreign Communication from a Related Counterpart Application, Extended European Search Report dated May 22, 2024, European Patent Application No. 24157141.3 filed on Dec. 30, 2020.

Final Office Action dated Mar. 31, 2025 U.S. Appl. No. 17/790,491, filed Jun. 30, 2022.

Foreign Communication from a Related Counterpart Application, European Office Action dated Mar. 22, 2024, European Patent Application No. 20845239.1 filed on Jul. 13, 2022.

Foreign Communication from a Related Counterpart Application, European Office Action dated Mar. 22, 2024, European Patent Application No. 20845238.3 filed on Jul. 13, 2022.

Notice of Allowance dated Sep. 15, 2025 U.S. Appl. No. 17/790,491, filed Jun. 30, 2022.

\* cited by examiner

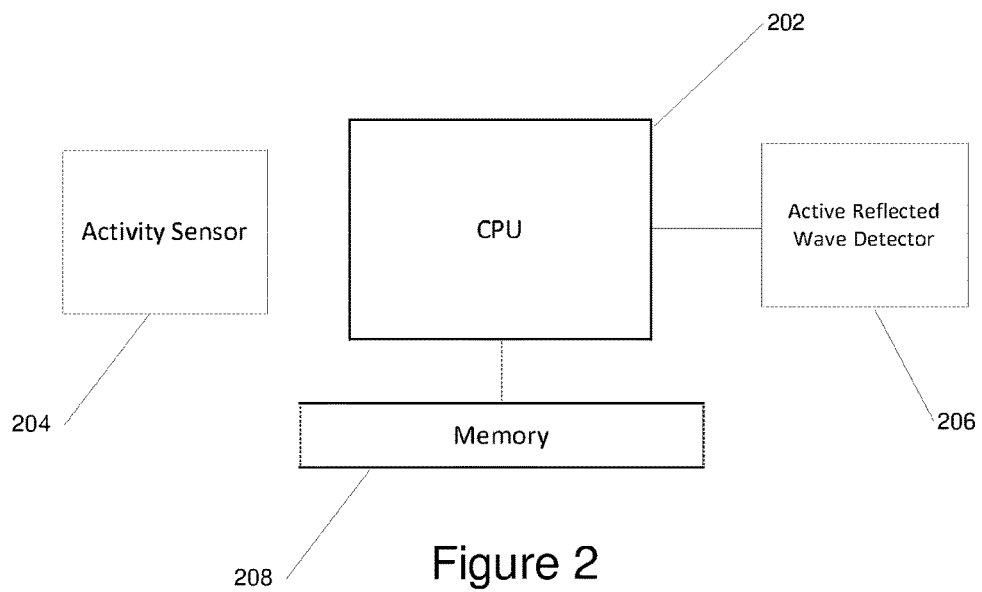
Figure 2
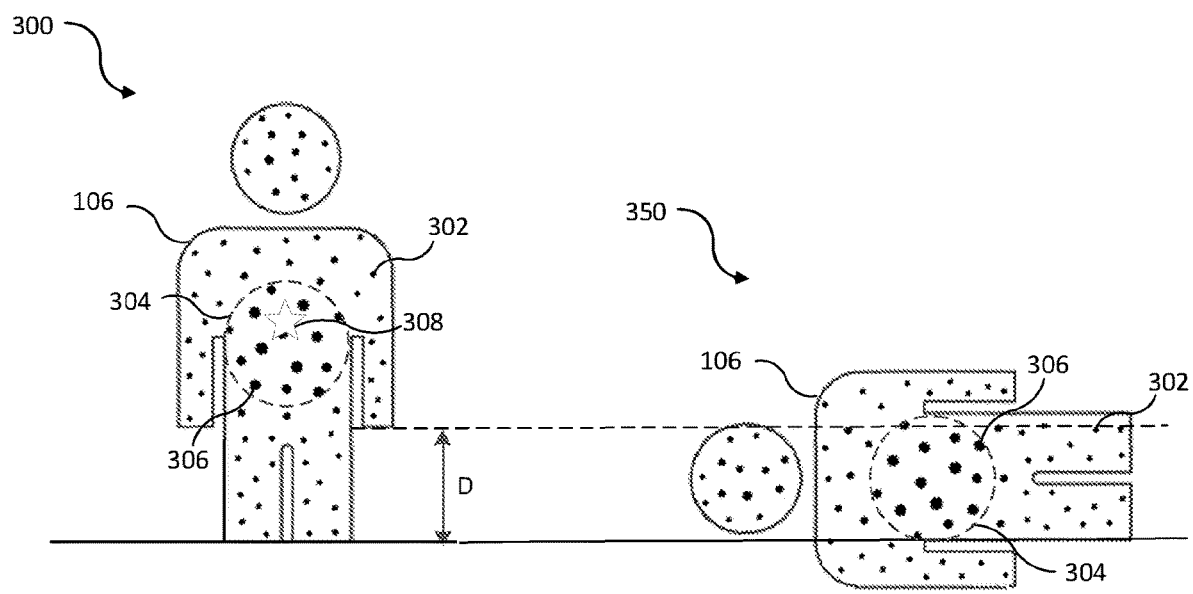
Figure 3a
Figure 3b

DEVICE FOR MONITORING AN ENVIRONMENT

RELATED APPLICATION/S

This application is a filing under 35 U.S.C. 371 as the National Stage of International Application No. PCT/IL2020/015336, filed 28 Dec. 2020, entitled "A DEVICE FOR MONITORING AN ENVIRONMENT," which claims the benefit of priority of G.B. Patent Application No. 1919450.5 filed with the Intellectual Property Office of the United Kingdom on 31 Dec. 2019, both of which are incorporated herein by reference in their entirety for all purposes.

TECHNICAL FIELD

The present invention relates generally to a device for monitoring an environment and more specifically to determining a condition of a person in the environment.

BACKGROUND

There is a need to use a monitoring system to automatically detect a status and/or presence of a person in a designated space, for example in an interior of a building. For example, an elderly person may end up in a hazardous situation in which they are unable to call for help, or unable to do so quickly. One such situation may be if they have fallen.

Some known systems have been developed in which the person wears a pendant which has an accelerometer in it to detect a fall based on kinematics. The pendant upon detecting a fall can transmit an alert signal. However the person may not want to wear, or may be in any case not wearing, the pendant.

Other reflected-wave based systems such as radar (whether radio wave, microwave or millimeter wave), lidar or sonar, are known to monitor a person in a designated space.

However, the inventors have identified that the known reflected-wave based systems consume significant power, which can cause challenges applications in which low power consumption is a key requirement.

SUMMARY OF THE INVENTION

The present invention provides a device for mounting on a wall for monitoring an environment according to the independent claim appended hereto. Further advantageous embodiments are found in the dependent claims, also appended hereto.

We describe a device for mounting on a wall for monitoring an environment, comprising: a motion sensor for detecting motion of a person within a first field of view of the motion sensor; an active reflective wave sensor for detecting the presence of a person within a second field of view of the active reflective wave sensor using wave reflections from the environment, the first and second fields of views at least partially overlapping one another, and a processor coupled to the motion sensor and active reflective wave sensor for receiving output from each of the motion sensor and active reflective wave sensor, wherein operation of the active reflective wave sensor is dependent on a detection of motion of a person within at least a portion of the first field of view by the motion sensor.

Active reflective wave sensors often consume more power when activated compared to motion detectors. As such, a device whereby the activation of the active reflective wave sensor is dependent on the detection of motion by a lower-power consuming motion detector detecting motion, advantageously reduces the power requirement in order to monitor an environment, or a person within the environment being monitored. Furthermore, the overlapping fields of views of the motion detector and the active reflective wave sensor means that the environment may still be monitored even if a person moves outside of the field of view of the motion detector.

The second field of view may be greater than the at least a portion of the first field of view. Preferably at least one boundary of the second field of view extends more vertically downwards than a lower boundary of the first field of view.

At least a portion of the first field of view may comprise an area of the first field of view that overlaps the second field of view.

The at least a portion of the first field of view may comprise an area within the first field of view below a predefined vertical height relative to a position of the device when mounted on a wall.

Operation of the active reflective wave sensor may be activated upon expiry of a time window that commences in response to the motion sensor detecting motion of a person. In this case, the processor may be configured to: determine a status of the environment and/or of a person therein based on an output received from the active reflected wave detector that is indicative of one or more of the measured wave reflections; wherein the processor delays expiry of the time window in response to the motion sensor detecting activity in the environment during the time window.

In either of the above, the device may commence a fall detection in response to detecting a presence of a person, the detecting of the person being based on an output of the active reflective wave sensor.

The active reflective wave sensor may be deactivated at least temporarily upon detecting a status of a person.

When the active reflective wave sensor is activated, the processor may be configured to: classify a first status of the person as being in a fall position or a non-fall position, based on an output of the active reflected wave sensor; wherein if the first status is that the person is in a fall position, the processor is further configured to: after receiving the output upon which the first status is classified, deactivate the active reflected wave sensor for a first time window; upon expiry of the first time window, reactivate the active reflected wave sensor and using the output of the active reflected wave sensor after the reactivating to classify a second status of the person as being in a fall position or a non-fall position; and determine a condition of the person as being in a fall condition in response to at least the second status being that the person is in a fall position.

Operation of the active reflective wave sensor may be triggered when the motion sensor detects motion of a person.

The motion sensor may be positioned vertically above the active reflective wave sensor when mounted on a wall. Or, the motion sensor may be positioned vertically below the active reflective wave sensor when mounted on a wall, in which case the active reflective wave sensor is arranged to protrude horizontally beyond the motion sensor. Either of these arrangements enable the active reflective wave sensor to have a field of view that extends more vertically downwardly than the motion sensor.

The motion sensor may comprise a Passive InfraRed (PIR) sensor. The active reflective wave sensor may comprise a radar sensor.

The radar sensor may identify 3-dimensional coordinates of received reflected waves. The device may use the coordinates to identify the person as being in fallen condition.

The device may identify the person as being in a fall condition by comparing the 3-dimensional coordinates of received reflected waves and training data, the training data including: for cases in which a person is in a fall position, 3-dimensional coordinates at which waves from the or one or more other active reflected wave sensors were reflected to the or the one or more other active reflected wave sensors, respectively. The one or more other active reflected wave sensors may be equivalently installed to said active reflected wave sensors. The installations may be equivalent by virtue of being at the same height and orientation.

The device may identify the person as being in a fall position based on height metric based on 3-dimensional coordinates at which waves from the active reflected wave sensor were reflected to the active reflected wave sensor that are within a threshold distance from a floor.

In all of the above, the device may be a fall detector.

The instructions may be provided on one or more carriers. For example there may be one or more non-transient memories, e.g. a EEPROM (e.g. a flash memory) a disk, CD- or DVD-ROM, programmed memory such as read-only memory (e.g. for Firmware), one or more transient memories (e.g. RAM), and/or a data carrier(s) such as an optical or electrical signal carrier. The memory/memories may be integrated into a corresponding processing chip and/or separate to the chip. Code (and/or data) to implement embodiments of the present disclosure may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE SEVERAL VIEWS OF THE DRAWINGS

The present invention will now be described, by way of example only, and with reference to the accompanying figures, in which:

FIG. 2 is a simplified schematic block diagram of the device;

FIGS. 3a and 3b illustrates a human body with indications of reflections measured by a reflective wave detector when the person is in a standing non-fall state and in a fall state;

DETAILED DESCRIPTION

Figure 1:
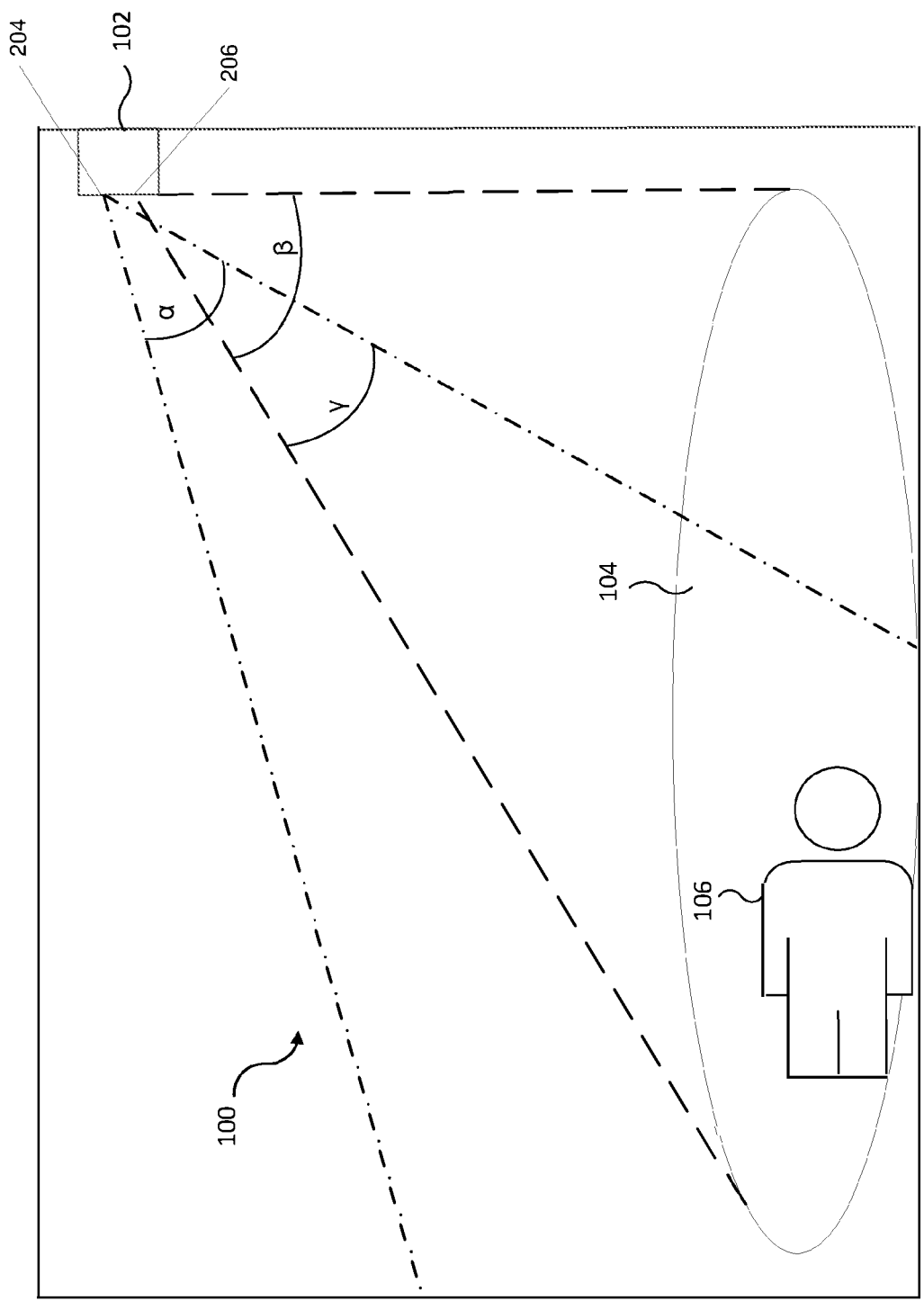
FIG. 1 illustrates an environment in which a device has been positioned.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized, and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims and their equivalents.

In the following embodiments, like components are labelled with like reference numerals. In the following embodiments, the term data store or memory is intended to encompass any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., EEPROM, solid state drives, random-access memory (RAM), etc.), and/or the like.

As used herein, except wherein the context requires otherwise, the terms "comprises", "includes", "has" and grammatical variants of these terms, are not intended to be exhaustive. They are intended to allow for the possibility of further additives, components, integers or steps.

The functions or algorithms described herein are implemented in hardware, software or a combination of software and hardware in one or more embodiments. The software comprises computer executable instructions stored on computer readable carrier media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor.

Specific embodiments will now be described with reference to the drawings.

FIG. 1 illustrates an environment 100 in which a device 102 has been positioned. The environment 100 may for example be an indoor space such as a room of a home, a nursing home, a public building or other indoor space. Alternatively the environment may be an outdoor space such as a garden. The device 102 is configured to monitor a space 104 in the environment 100 in which a person 106 may be present.

An embodiment of the present invention relates to the detection of a person 106 having fallen (that is, being in a fall position) which is illustrated in FIG. 1.

FIG. 2 illustrates a simplified view of the device 102. As shown in FIG. 2, the device 102 comprises a central processing unit ("CPU") 202, to which is connected a memory 208. The functionality of the CPU 202 described herein may be implemented in code (software) stored on a memory (e.g. memory 208) comprising one or more storage media, and arranged for execution on a processor comprising on or more processing units. The storage media may be integrated into and/or separate from the CPU 202. The code is configured so as when fetched from the memory and executed on the processor to perform operations in line with embodiments discussed herein. Alternatively it is not excluded that some or all of the functionality of the CPU 202 is implemented in dedicated hardware circuitry, or configurable hardware circuitry like an FPGA.

FIG. 2 shows the CPU 202 being connected to an activity sensor 204 (in the form of a motion detector) and an active reflected wave detector 206. In general, the active reflected wave detector 206 consumes more power in an activated state (i.e. when turned on and operational) than the activity sensor 204 does when in an activated state. While in the illustrated embodiment the activity sensor 204 and reflected wave detector are separate from the CPU 202, in other embodiments, at least part of processing aspects of the activity sensor 204 and/or active reflected wave detector 206 may be provided by a processor that also provides the CPU 202, and resources of the processor may be shared to provide the functions of the CPU 202 and the processing aspects activity sensor 204 and/or active reflected wave detector 206. Similarly, functions of the CPU 202, such as those described herein, may be performed in the activity sensor 204 and/or the active reflected wave detector 206. It will be appreciated from the below that in some embodiments, the activity sensor 204 may not be present.

As shown in FIG. 2, the device 102 may house both the activity sensor 204 and the active reflected wave detector 206. Alternatively, the activity sensor 204 may be external to the device 102 and be coupled to the CPU 202 by way of a wired or wireless connection. Similarly, the active reflected wave detector 206 may be external to the device 102 and be coupled to the CPU 202 by way of a wired or wireless connection.

In some embodiments, the CPU 202 is configured to detect activity in the monitored space 104 based on an output of the activity sensor 204. The activity sensor 204 may comprise a motion sensor such as a passive infrared (PIR) sensor. The output from the PIR sensor may be analysed in the CPU to detect motion, or the activity sensor 204 may itself be the motion detector. The motion detector is preferably a PIR detector, however it could be an active reflected wave sensor, for example radar, that detects motion based on the Doppler effect. That is, the activity sensor 204 may be a radar based motion detector which detects motion based on the doppler component of a radar signal.

In some embodiments, the CPU 202 is configured to detect the presence of a person in the monitored space 104, and if a person is present, classify the state of the person based on an output of the active reflected wave detector 206.

The active reflected wave detector 206 may operate in accordance with one of various reflected wave technologies. Preferably, the active reflected wave detector 206 is a radar sensor. The radar sensor 206 may be use millimetre wave (mmWave) sensing technology. The radar is, in some embodiments, a continuous-wave radar, such as frequency modulated continuous wave (FMCW) technology. Such a chip with such technology may be, for example, Texas Instruments Inc. part number IWR6843. The radar may operate in microwave frequencies, e.g. in some embodiments a carrier wave in the range of 1-100 GHz (76-81 Ghz or 57-64 GHz in some embodiments), and/or radio waves in the 300 MHz to 300 GHz range, and/or millimetre waves in the 30 GHz to 300 GHz range. In some embodiments, the radar has a bandwidth of at least 1 GHz.

The active reflected wave detector 206 is not limited to being a radar sensor, and in other embodiments, the active reflected wave detector 206 is a LIDAR sensor, or a sonar sensor.

The active reflected wave detector 206 being a radar sensor is advantageous over other reflected wave technologies in that radar signals can transmit through some materials, e.g. wood or plastic, but not others—notably water which is important because humans are mostly water. This means that the radar can potentially "see" a person in the environment 100 even if they are behind such an object, this is not the case for sonar.

Referring back to FIG. 1, each of the activity sensor 204 and the active reflected wave detector 206 has a field of view. The activity sensor 204 and the active reflected wave detector 206 are arranged such that their fields of view overlap. The fields of view of the activity sensor 204 and the active reflected wave detector 206 may partially or fully overlap. This is illustrated in FIG. 1, where the activity sensor 204 has a first field of view (as denoted by the angle α), and the active reflected wave detector 206 has a second field of view (as denoted by the angle β). The portions of the first and second fields of view that overlap is denoted by the angle γ.

The overlapping, or partial overlapping, of the fields of view is, in some embodiments, in the 3D sense. However in other embodiments the overlapping, or partial overlapping, of the fields of view may be in a 2D, plan view, sense. For example there may be an overlapping field of view in the X and Y axes, but with a non-overlap in the Z axis.

In some embodiments whereby the activity sensor 204 is a motion detector, the motion detector 204 may have a vertical field of view limited to heights above a predefined height threshold (e.g. 70 cm) above the floor level, which is one way to avoid/reduce triggering by pets. In other embodiment, the field of view of the motion detector 204 may be limited due to physical or optical limitations in the motion detector, such as the type of lens chosen (e.g. cylindrical). In such embodiments where there are physical and/or optical limitations, the motion detector 204 may not be able to detect motion at an angle that is directly below the motion detector.

The device 102 is designed and arranged such that the active reflected wave detector 206 has a field of view that includes heights below such height threshold, over a horizontal area on interest, e.g. at least between the threshold and the floor level, to be able to detect the person when they are close to the floor—which is a situation that means they may have fallen. In some embodiments the field of view of the active reflected wave detector 206 also includes heights above the height threshold so as to assist in any reflected-wave measurements of the person when the person is standing. Furthermore, the active reflective wave detector 206 may be arranged to have a field of view that extends substantially vertically downward below the device 102. In any or all of the embodiments, the field of view of the active reflective wave detector 206 may be greater than the field of view of the motion sensor 204.

As discussed above, the active reflected wave detector 206 uses more power when in operation than the motion detector 204, but the motion detector 204 on its own (with or without a limited field of view) cannot make a determination of whether or not a person within its field of view has fallen.

As such, in the present invention, operation of the active reflective wave detector 206 may be dependent on a detection of motion of a person within at least a portion of the first field of view of the motion detector 204. In its simplest embodiment, should the motion detector 204 detect motion of a person within a portion of its field of view, the processor 202 activates the active reflective wave detector 206, which can then sense a person within its field of view. From there, a determination of the condition of the person with the field of view may be made, i.e. whether or not the person is in a fall condition.

The field of view of the active reflective wave detector 206 may advantageously shaped and oriented to detect a person over a greater spread of distances from the device 102 (at least in the direction directly forward of the device 102) than can be achieved with the field of view of the motion detector 204. In any case, the spread of distances in which a person can be detected by the active reflective wave detector 206 but not the motion sensor 204, at least when lying on the floor and at least in the direction directly forward of the device 102 includes a range of distances most proximal to the device 102. This results in the field of view of the active reflective wave detector extending substantially vertically below the device 102, and enables that a person in a fall condition may be detected by the active reflective wave detector 206, even if they move outside of the field of view of the motion detector 204. The person may have approached the most proximal distances from further distances in which motion detector 204 did detect them. Though they subsequently fell into the more proximal distances not detectable by the motion detector 204, they will nonetheless me detected by the active reflective wave detector 206 since the active reflective wave detector 206 would have been triggered into operation because of the previous detection by the motion detector 204.

Whilst FIG. 1 shows that the active reflective wave detector 206 is positioned vertically lower on the device 102 than the activity or motion detector 204. This arrangement permits the field of view of the active reflective wave detector 206 to extend more vertically downwardly than the field of view of the motion detector 204. However, other arrangements of the active reflective wave detector 206 and motion detector 204 may be possible on the device 102. For example, the active reflective wave detector 206 may be positioned on the device 102 at a vertically higher position than the activity or motion detector 204, in which case it is preferable that the active reflective wave detector 206 protrudes horizontally beyond the position of the motion detector 204. This arrangement also permits the field of view of the active reflective wave detector 206 to extend more vertically downwardly than the field of view of the motion detector 204. Other arrangements are also possible, where the active reflective wave detector 206 may be positioned to a side of the motion detector 204. In any arrangement where the field of view of the active reflective wave detector 206 is likely to be impeded by the position of the motion detector 204, it is preferable that the active reflective wave detector 206 protrudes horizontally beyond the position of the motion detector 204.

More complex schemes in terms of the activation of the active reflective wave detector 206 are envisaged, and some will be described below. First, we will describe the characterisation of the fall conditions.

In embodiments, the active reflected wave detector 206 is used to determine whether the person within its field of view is in a posture that may be relate to them having fallen. This may be achieved for example by detecting a height associated with a certain location on their body, e.g. a location above their legs.

In operation, the active reflected wave detector 206 may perform one or more reflected wave measurements at a given moment of time, and over time these reflected wave measurements can be correlated by the CPU 202 with the presence of a person and a state/condition of the person. In the context of the present disclosure, the state of the person may be a characterization of the person based on a momentary assessment. For example, a classification passed on their position (e.g. in a location in respect to the floor and in a configuration which are consistent or inconsistent with having fallen) and/or their kinematics (e.g. whether they have a velocity that is consistent or inconsistent with them having fallen, or having fallen possibly being immobile). In the context of the present disclosure, the condition of the person may comprise a determination of an aspect of the person's health or physical predicament, for example whether they are in a fall condition whereby they have fallen and are substantially immobile, such that they may not be able (physically and/or emotionally) to get to a phone to call for help. In some embodiments this involves an assessment of the person's status over time, such as in the order or 30-60 seconds. However, the condition of the person may in some contexts be synonymous with the status of the person. For example, by determining that the person is in a safe supported state or a standing state, it may be concluded that the person is not currently in a fall condition, whereby they are on the floor and potentially unable to seek help. It may additionally or alternatively be concluded that they are in a resting condition because of their status being determined to be in a safe supported state, e.g. lying on a bed. In another example their condition may be classified as active and/or mobile based on a determination of a walking status.

FIG. 3a illustrates a free-standing human body 106 with indications of reflective wave reflections therefrom in accordance with embodiments.

For each reflected wave measurement, for a specific time in a series of time-spaced reflective wave measurements, the reflective wave measurement may include a set of one or more measurement points that make up a "point cloud". Each point 302 in the point cloud may be defined by a 3-dimensional spatial position from which a reflection was received, and defining a peak reflection value, and a doppler value from that spatial position. Thus, a measurement received from a reflective object may be defined by a single point, or a cluster of points from different positions on the object, depending on its size. In some embodiments the point cloud is prefiltered to exclude points for which a doppler value is below a threshold. In some embodiments the point cloud is prefiltered to exclude points for which a doppler value is below a threshold.

FIG. 3a illustrates a map of reflections. The size of the point represents the intensity (magnitude) of energy level of the radar reflections (see larger point 306). Different parts or portions of the body reflect the emitted signal (e.g. radar) differently. For example, generally, reflections from areas of the torso 304 are stronger than reflections from the limbs. Each point represents coordinates within a bounding shape for each portion of the body. Each portion can be separately considered and have separate boundaries, e.g. the torso and the head may be designated as different portions. The point cloud can be used as the basis for a calculation of a reference parameter or set of parameters which can be stored instead of or in conjunction with the point cloud data for a reference object (human) for comparison with a parameter or set of parameters derived or calculated from a point cloud for radar detections from an object (human).

When a cluster of measurement points are received from an object in the environment 100, a location of a particular part/point on the object or a portion of the object, e.g. its centre, may be determined by the CPU 202 from the cluster of measurement point positions having regard to the intensity or magnitude of the reflections (e.g. a centre location comprising an average of the locations of the reflections weighted by their intensity or magnitude). As illustrated in FIG. 3a, the reference body has a point cloud from which its centre has been calculated and represented by the location 308, represented by the star shape. In this embodiment, the torso 304 of the body is separately identified from the body and the centre of that portion of the body is indicated. In alternative embodiments, the body can be treated as a whole or a centre can be determined for each of more than one body part e.g. the torso and the head, for separate comparisons with centres of corresponding portions of a scanned body.

In one or more embodiments, the object's centre or portion's centre is in some embodiments a weighted centre of the measurement points. The locations may be weighted according to an Radar Cross Section (RCS) estimate of each measurement point, where for each measurement point the RCS estimate may be calculated as a constant (which may be determined empirically for the reflected wave detector 206) multiplied by the signal to noise ratio for the measurement divided by $R^4$, where R is the distance from the reflected wave detector 206 antenna configuration to the position corresponding to the measurement point. In other embodiments, the RCS may be calculated as a constant multiplied by the signal for the measurement divided by $R^4$. This may be the case, for example, if the noise is constant or may be treated as though it were constant. Regardless, the received radar reflections in the exemplary embodiments described herein may be considered as an intensity value, such as an absolute value of the amplitude of a received radar signal.

In any case, the weighted centre, WC, of the measurement points for an object may be calculated for each dimension as:

$$WC = \frac{1}{\sum_{n=1}^{N} W_n} \sum_{n=1}^{N} (W_n P_n)$$

Where:
N is the number of measurement points for the object;
$W_n$ is the RCS estimate for the $n^{th}$ measurement point; and
$P_n$ is the location (e.g. its coordinate) for the $n^{th}$ measurement point in that dimension.

In some embodiments, the CPU 202 is configured to process measured wave reflections from the environment that are measured by the an active reflected wave detector 206 to detect whether a person is in the environment and, if a person is detected, classify a state of the person in the environment.

As will be described in more detail below, this need not be a two-step process i.e. of looking for a person and then classifying them. For example, the CPU 202 may take the output of the active reflected wave detector 206 and do a classification, wherein one of the outputs of the classification is that there is no person, or in other embodiments it may only conclude that there is no person if it fails to perform a classification of a person's status.

When classifying the state of a person, the CPU 202 may perform a determination that the person is in a fall position (i.e. a position that is consistent with them haven fallen) or a non-fall position (indicative that they are, at least temporarily, in a safe state). In embodiments of the present disclosure the determination that the person is in a fall position is used as an indicator that the person may be in need of help. Being in a position which is consistent with the person having fallen does not necessarily mean they have fallen, or have fallen such that they need help. For example, they may be on the floor for other reasons, or they may have had a minor fall from which they can quickly recover. However, if they remain in a fall position for sufficient time it may be concluded that they are sufficiently likely to have fallen to be classified as being in a fall condition, and the device 102 may therefore take appropriate action accordingly, e.g. by sending a notification to a remote device.

In some embodiments, the classification performed by the CPU 202 may provide further detail on the non-fall condition for example, the CPU 202 may be able to classify the person as being in a free-standing state (e.g. they are walking), in a safe supported state which may be a reclined safe supported state whereby they are likely to be safely resting (e.g. a state in which they are in an elevated lying down position, or in some embodiments this may additionally encompass being in a sitting position on an item of furniture) or a standing safe supported state (e.g. they are standing and leaning on a wall). In other embodiments the non-fall states may be grouped differently. For example, the non-fall states may include a stationary non-floor position (encompassing both a reclined safe supported state and a standing stationary state whether supported or not in the standing state) and an ambulatory state. The CPU 202 may be able to classify the person as crawling, which may be regarded as a fall state or a non-fall state (given that if the person has fallen the person is still able to move so may be regarded as less critical) dependent on how the CPU 202 is configured.

The classification may be performed by the CPU 202 by looking at a set of sequential frames over a period of time and classifying the state of the person as being in a fall position based on the person's fall/non-fall positions for the respective frames. Multiple frames (e.g. 10 frames) may be used to determine whether there are more fall or non-fall results to improve the accuracy of the determination (the result which occurs more is the selected result).

Using Thresholds

In some embodiments, in order to detect and classify the state of a person the CPU 202 processes the measured wave reflections by determining one or more parameters associated with the measured wave reflections and then comparing the parameter(s) to one or more thresholds to detect and classify the state of a person.

The person may be tracked using a tracking module in the CPU 202. The tracking module can use any known tracking algorithm. For example, the active reflected wave detector 206 may generate a plurality of detection measurements (e.g. up to 100 measurements, or in other embodiments hundreds of measurements) for a given frame. Each measurement can be taken a defined time interval apart such as 0.5, 1, 2 or 5 seconds apart. Each detection measurement may include a plurality of parameters in response to a received reflective wave signal above a given threshold. The parameters for each measurement may for example include an x and y coordinate (and z coordinate for a 3D active reflected wave detector 206), a peak reflection value, and a doppler value corresponding to the source of the received radar signal.

The data can then be processed using a clustering algorithm to group the measurements into one or more measurement clusters corresponding to a respective one or more targets. An association block may then associate a given cluster with a given previously measured target. A Kalman filter of the tracking module may then be used to determine the next position of the target based on the corresponding cluster of measurements and the prediction of the next position based on the previous position and other information e.g. the previous velocity.

From the reflected wave measurements an RCS of an object represented by a cluster of measurement points can be estimated by summing the RCS estimates of the each of the measurement points in the cluster. This RCS estimate may be used to classify the target as a human target if the RCS is within a particular range potentially relevant to humans for the frequency of the signal emitted by the active reflected wave detector 206, as the RCS of a target is frequency dependent. Taking a 77 GHz radar signal as an example, from empirical measurements, the RCS (which is frequency dependent) of an average human may be taken to be in the order of 0.5 $m^2$, or more specifically in a range between 0.1 and 0.7 $m^2$, with the value in this range for a specific person depending on the person and their orientation with respect to the radar. The RCS of human in the 57-64 GHz spectrum is similar to the 77 GHz RCS—i.e. 0.1 and 0.7 $m^2$.

The tracking module may output values of location, velocity and/or RCS for each target, and in some embodiments also outputs acceleration and a measure of a quality of the target measurement, the latter of which is essentially to act as a noise filter. The values of position (location) and velocity (and acceleration, if used) may be provided in 2 or 3 dimensions (e.g. cartesian or polar dimensions), depending on the embodiment.

The Kalman filter tracks a target object between frames and therefore multiple frames of reflection measurement data can be used to determine a person's velocity. Three or more frames (e.g. 3-5 frames) may be required in order to determine that there is movement exceeding a movement threshold. The frames may be taken at a rate of 2 Hz, for example.

In order to classify the state of the person in the environment, the CPU 202 may determine a height metric associated with at least one measurement of a reflection from the person conveyed in the output of the active reflected wave detector 206 and compare the height metric to at least one threshold.

The height metric may be a height of a weighted centre of the measurement points of a body or part thereof (where each measurement is weighted by the RCS estimation), and the CPU 202 may compare this height metric to a threshold distance, D, from the floor (e.g. 30 cm) and determine that the person in the environment is in a standing (non-fall) position if the height metric exceeds the threshold distance, this is illustrated in FIG. 3a.

The height metric used to classify the state of the person is not limited to being a height of a weighted centre of the measurement points of the person's body or part thereof. In another example, the height metric may be a maximum height of all of the height measurements associated with the person's body or part thereof. In another example, the height metric may be an average height (e.g. median z value) of all of the height measurements of the person's body or part thereof. In the case of using a weighted centre or average height, the "part thereof" may beneficially be a part of the body that is above the person's legs to more confidently distinguish between fall and non-fall positions.

If the height metric (e.g. weighted centre, average height and/or maximum height) is within (less than) the threshold distance, D, from the floor, the CPU 202 may determine that the person in the environment is in a fall position, this is illustrated in FIG. 3b. If the height metric is greater than a first threshold distance from the floor but less than a second threshold distance from the floor for example the a maximum height amongst the measurements associated with body is between 30 cm and 1.3 m, the CPU 202 may be able to detect that the person is in a safe reclined position e.g. lying down on a bed or couch, which is an example of a non-fall position.

In order to classify the state of the person in the environment, the CPU 202 may determine a velocity associated with the person using the measurements of reflections that are conveyed in the output of the active reflected wave detector 206 and compare the velocity to a velocity threshold. The tracking module referred to above may output a value of velocity for the target (person in the environment). For example, the velocity may assist in classifying whether a human is present in the environment. For example, it may be concluded that no human is present if there is no detected object having a velocity within a predefined range and or having certain dynamic qualities that are characteristic of a human. The comparison between the detected velocity associated with the person and the velocity threshold can also assist with narrowing the classification down to a specific state. For example if the detected velocity associated with the person is greater than the velocity threshold the CPU 202 can determine that the person is moving and is in either a crawling state or standing ambulatory state (e.g. they are walking). If the detected velocity associated with the person is not greater than the velocity threshold the CPU 202 may determine that the person is not moving and is either in a fall condition or are in a reclined supported state (e.g. they are in an elevated lying down position or in a sitting position) or standing still.

Further if for a defined duration of time, a standard deviation of the velocity is below a predefined threshold it may be concluded that a person that is standing still is supported, e.g. leaning on a wall; or if above the threshold, that they are free-standing. In other embodiments the value of the velocity threshold alone or in combination with the standard deviation may be used to distinguish a free-standing state from a supported state.

In order to classify the state of the person in the environment, the CPU 202 may determine a spatial distribution, e.g. a variance or standard deviation, of the measurements of reflections that are conveyed in the output of the active reflected wave detector 206 and compare the spatial distribution to a threshold. This may include determining a horizontal spatial distribution of the measurements of reflections that are conveyed in the output of the active reflected wave detector 206 and comparing the horizontal spatial distribution to a horizontal spatial distribution threshold. Alternatively or additionally, this may include determining a vertical spatial distribution of the measurements of reflections that are conveyed in the output of the active reflected wave detector 206 and comparing the vertical spatial distribution to a vertical spatial distribution threshold.

The comparison between the spatial distribution(s) to a threshold can assist with narrowing the classification down to a specific state. For example, if the vertical spatial distribution is greater than the vertical spatial distribution threshold (high z variance) and/or the horizontal spatial distribution is less than the horizontal spatial distribution threshold (low x-y plane variance), then the CPU 202 can determine that the person is in a standing state, for example they may be in a free-standing ambulation state (e.g. they are walking), in a safe supported state (e.g. they are standing and leaning on a wall), or a free-standing unsupported state. In another example, if the vertical spatial distribution is less than the vertical spatial distribution threshold (low z variance) and/or the horizontal spatial distribution is greater than the horizontal spatial distribution threshold (high x-y plane variance), then the CPU 202 can determine that the person is in a fall state or in a safe supported state (e.g. they are in an elevated lying down position). Alternatively the ratio of the horizontal spatial distribution to vertical spatial distribution may be compared with a threshold. Such a ratio being below a threshold that has a value less than 1 may be taken to indicate that the person is in a standing state. Such a ratio being above a threshold that has a value greater than 1 may be taken to indicate that the person is in a fall state or in an elevated lying down position, and hence in a safe supported state.

Using a Classifier Model

In other embodiments, in order to detect and classify the state of a person, rather than the CPU 202 determining one or more parameters associated with the measured wave reflections and then comparing the parameter(s) to one or more thresholds, the CPU 202 may supply the determined parameters as inputs into a trained classifier module running on the CPU 202.

The trained classifier module may be trained using one or more training data sets which include reflective wave measurements and a corresponding definition of which output state the reflective wave measurements correspond to.

The received parameters may include one or more of: (i) a height metric associated with at least one reflection; (ii) a velocity associated with the person using the measurements of reflections; and (iii) a spatial distribution characterization of the measurements (e.g. one or more of a horizontal spatial distribution (e.g. a variance or equivalently a standard deviation), a vertical spatial distribution and a ratio therebetween. Additionally, RCS estimates may be used to aid in assessing whether the object being classified is in fact a human. Analysis of the wave reflections to determine whether the object is likely to be human may be performed before or after the classification, but in other embodiments it may be performed as part of the classification. Thus, the classifier may additionally receive the following parameters: (iv) a sum of RCS estimates, and in some embodiments (v) a distribution (e.g., variance or equivalently standard deviation) of RCS estimates. For example, the received parameters may be: 1. an average height (e.g. median z value); 2. a standard deviation of RCS estimates; 3. A sum of RCS estimates; and 4. a standard deviation of height(z) values.

In these embodiments the trained classifier module uses the received parameters and the training data set(s) to classify the state of the person in the environment.

It will be appreciated that this can be implemented in various ways.

The trained classifier module may be used at operation time to determine a classification score, issuing a method known by the person skilled in the art. The score may for example provide an indication of a likelihood or level of confidence that the received parameters correspond to a particular classifier output state. A determination of a particular classification (e.g. a fall position) may for example be based on whether a classification confidence score is greater than a threshold then the person is determined to be in that state. For example, the CPU 202 may determine that the person is in a fall state if the output of the classifier determines that there is more than a 60% likelihood (or some other predefined likelihood threshold, which may optionally be greater than 50%, or even less than 50%, to be conservative/cautious) of the person being in a fall position.

It will be appreciated that it may not be necessary for the classifier module to be trained with a data set associated with a particular classifier state in order for the classifier module to classify the person as being in the particular classifier state. Consider the simple example whereby the trained classifier module is configured to indicate that the person is in one of two states (i.e. in a fall state or a non-fall state), the trained classifier module may have been trained with a data set including reflective wave measurements corresponding to a person in a fall state, and based on a low correlation of the received parameters to the training data set corresponding to a person in a fall state, the trained classifier module may be configured to indicate that the person is in a non-fall state.

Furthermore, as noted above, there need not be a two-step process of looking for a person and then classifying them. A trained classifier module could be used that is not necessarily limited to reflections from discreet objects or from objects already identified as potentially being human. For example a classifier could be fed respective sets of training data for (i) a person is present and in a fall position; (ii) a person is present and in a non-fall position; and (iii) no person is present. The classifier may determine a classification of active reflective wave measurements based on which of the trained states it is most closely correlated with.

Any other method, known by the person skilled in the art, of training and using the classifier based on (i) the receiving parameters as exemplified above, and (i) the relevant output states may alternatively be used.

I. Determining a Status of an Environment and/or a Person Therein

Figure 4:
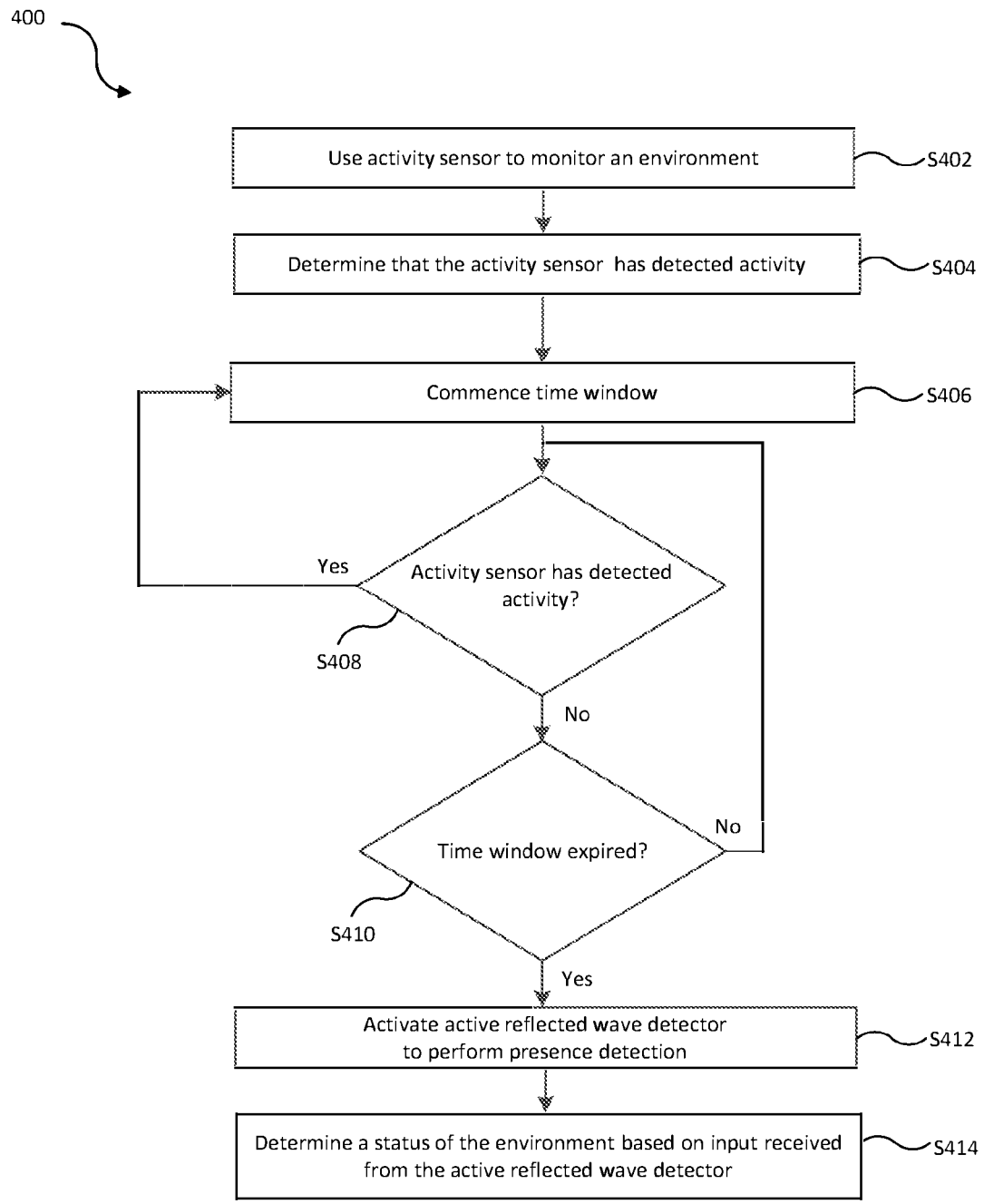
FIG. 4 illustrates a process for determining a status of an environment and/or of a person therein in accordance with a first embodiment of the present disclosure.

We now describe a first embodiment of the present disclosure with reference to FIG. 4 which illustrates a process 400 performed by the CPU 202 for determining a status of an environment and/or of a person therein.

It should be noted that when the process 400 is started, the active reflected wave detector 206 is in a deactivated state. In the deactivated state the active reflected wave detector 206 may be turned off. Alternatively, in the deactivated state the active reflected wave detector 206 may be turned on but in a low power consumption operating mode whereby the active reflected wave detector 206 is not operable to perform reflected wave measurements.

At step S402, the CPU 202 uses the activity sensor 204 to monitor the monitored space 104 in the environment 100. Step S402 may comprise the CPU 202 activating (i.e. turning on) the activity sensor 204. Alternatively, the activity sensor 204 may be activated (tuned on) immediately once the device 102 is powered on, and there may be no ability or need for the CPU to issue a command to activate the activity sensor 204 since it is automatically and always on.

At step S404, the CPU 202 determines that the activity sensor 204 has detected activity in the environment 100 based on monitoring the output of the activity sensor 204.

In response to the determination at step S404, the process 400 proceeds to step S406 where the CPU 202 commences a time window having a predefined duration. The predefined duration may be in the range 30 secs to 120 secs. The predefined duration may be in the range 45 secs to 105 secs. The predefined duration may be in the range 48 secs to 72 secs (i.e. 1 minute+/−20%). The predefined duration may for example be 1 minute. This time window has an expiry that is extended by detections of activity by the activity sensor 204.

In particular, if the CPU 202 determines at step S408 that the activity sensor 204 has detected activity, then the process 400 loops back to step S406 where the CPU 202 commences the time window again. That is, the time window commences after a last activity detection.

Step S406 may be performed in a number of ways. In one example, at step S406 the CPU 202 may control a counter (not shown in the figures), which may be internal or external to the CPU 202, to start counting. It will be appreciated that this counter may count incrementally or decrementally. In these embodiments, if after the counter has started counting the CPU 202 determines at step S408 that the activity sensor 204 has detected activity, the CPU 202 resets the counter. In another example, at step S406 the CPU 202 may start monitoring a real time clock that always runs and use the real time clock to monitor the time window, e.g. by setting a time associated with the real time clock at which the time window will end.

Upon determining at step S410 the expiry of the time window during which the activity sensor 204 has not detected activity in the environment, the process 400 proceeds to step S412 where the CPU 202 activates the active reflected wave detector 206 so that it is in an activated state and operable to measure wave reflections from the monitored space 104 of the environment 100.

In embodiments whereby prior to step S412 the active reflected wave detector 206 was turned off, step S412 comprises the CPU 202 turning the active reflected wave detector 206 on. In embodiments whereby prior to step S412 the active reflected wave detector 206 was turned on but in a low power consumption operating mode, step S412 comprises the CPU 202 controlling the active reflected wave detector 206 to be in a normal operating mode in which it is operable to perform reflected wave measurements.

At step S414, the CPU 202 determines a status of the environment and/or a person therein based on an output of the active reflected wave detector 206 that is indicative of one or more of the measured wave reflections.

As noted above, the active reflected wave detector 206 consumes more power in an activated state (i.e. when turned on and operational) than the activity sensor 204 in an activated state. Thus the process 400 uses a relatively low power consuming activity sensor (e.g. a PIR detector) to determine whether there is activity (e.g. movement) in a monitored space 104 of the environment 100. If no activity is detected for a first predetermined amount of time, then (and only then) the active reflected wave detector 206 is used to determine a status of the environment and/or a person therein.

If activity is no longer detected, either it is because the person has stopped moving enough to be detected by the activity sensor 204 or they can't be seen by the activity sensor (a probable cause of which is that they have left the monitored space 104). The former situation may mean that the person has fallen, alternatively they may be in a non-fall state for example they may be standing and not moving, or they may be safely resting, e.g. on a bed. If the activity sensor 204 started to detect activity (so the person entered the room), but thereafter detected no activity for the first predetermined amount of time, the active reflected wave detector 206 is used to determine if the situation is the former or the latter, i.e. whether they are in the monitored space 104 or not detectable (which is interpreted to mean that they are not in the monitored space 104).

Step S414 comprises detecting whether a person is in the environment whereby the status of the environment is determined to be either occupied or unoccupied.

In the event that a person is detected in the environment, step S414 may comprise determining a state of the person detected in the monitored space 104 of the environment 104. As noted above, in order to detect and classify the state of a person the CPU 202 may processes measured wave reflections by determining one or more parameters associated with the measured wave reflections and then comparing the parameter(s) to one or more thresholds to detect and classify the state of a person. In other embodiments, the CPU 202 determines one or more parameters associated with the measured wave reflections and then supplies the determined parameters as inputs into a trained classifier module running on the CPU 202. An explanation on how the CPU 202 may determining a state of the person detected in the monitored space 104 of the environment using these methods is described above and thus is not repeated here.

In the first embodiment, by only activating the active reflected wave detector 206 in the situation when there is potentially a person in the environment in a fall position (i.e. when there has been no activity detections in a time window) less power is consumed and this efficient use of power is particularly advantageous in embodiments where the device 102 is powered by a power source with a limited supply (e.g. a battery).

In response to completion of the step S414 CPU 202 may be configured to deactivate the active reflected wave detector 206 to provide further power savings.

II. Determining a Condition of a Person in an Environment

Figure 5A:
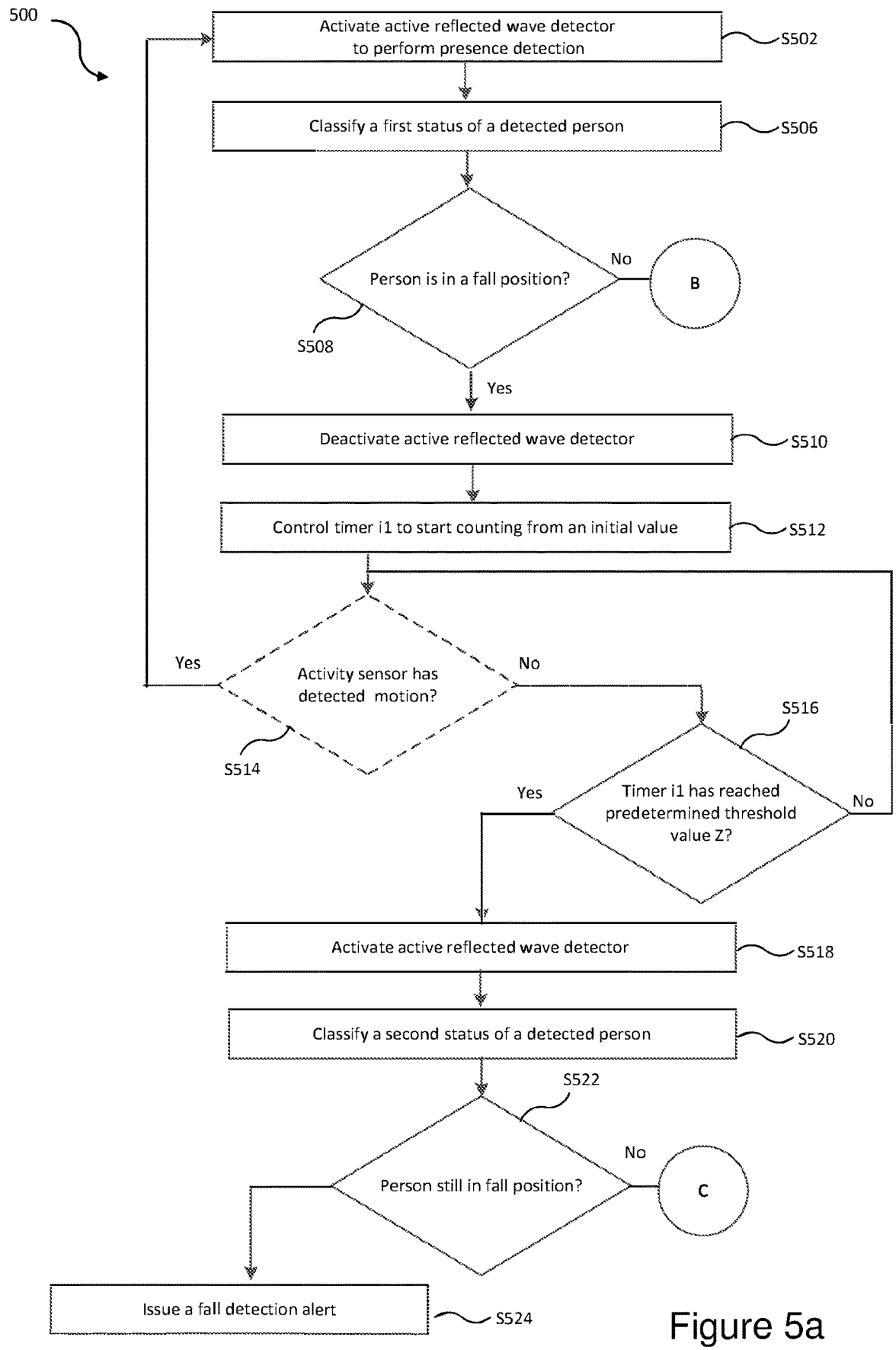
FIGS. 5a and 5b illustrate a process for determining a condition of a person in an environment in accordance with a second embodiment of the present disclosure.
Figure 5B:
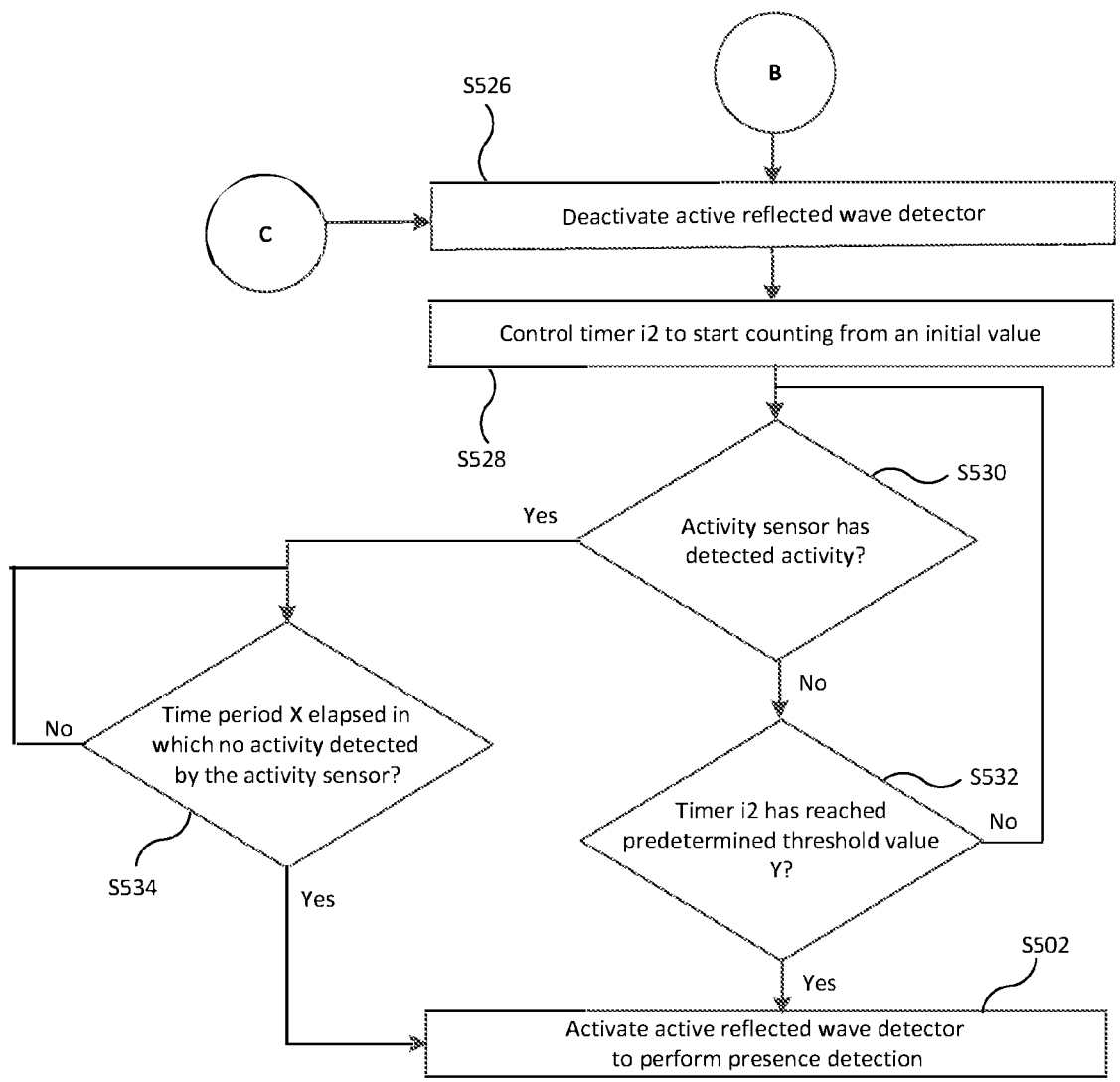

We now describe a second embodiment of the present disclosure with reference to FIGS. 5a and 5b, which illustrates a process 500 performed by the CPU 202 for determining a condition of a person in an environment.

The second embodiment relates to the detection of a fall condition necessitating an alert action, which is distinct from a fall position which may be temporary, non-threatening, and/or easily confused with other reasons for being on the floor.

It should be noted that when the process 500 is started, the active reflected wave detector 206 is in a deactivated state. In the deactivated state the active reflected wave detector 206 may be turned off. Alternatively, in the deactivated state the active reflected wave detector 206 may be turned on but in a low power consumption operating mode whereby the active reflected wave detector 206 is not operable to perform reflected wave measurements.

At step S502 the CPU 202 activates the active reflected wave detector 206 so that it is in an activated state and operable to measure wave reflections from the environment.

In embodiments whereby prior to step S502 the active reflected wave detector 206 was turned off, step S502 comprises the CPU 202 turning the active reflected wave detector 206 on. In embodiments whereby prior to step S502 the active reflected wave detector 206 was turned on but in a low power consumption operating mode, step S502 comprises the CPU 202 controlling the active reflected wave detector 206 to be in a normal operating mode in which it is operable to perform reflected wave measurements.

At step S506, the CPU 202 classifies a first status of a person detected in the environment as being in a fall position or a non-fall position, based on measured wave reflections in the output of the active reflected wave detector 206.

Steps S502 and S506 may correspond to steps S412 and S414 described above with reference to FIG. 4. That is, the first embodiment and the second embodiment described herein may be combined. However this is not essential and the first embodiment and the second embodiment may be independent from each other.

In response to the person being classified as being in a fall position at step S508, at step S510 the active reflected wave detector 206 is deactivated. Whilst step S510 is shown as being performed after step S508 this need not be the case, the deactivation merely has to happen after the relevant data needed for the classifying (at step S506) is received.

The process 500 proceeds to step S512 where the CPU 202 commences a first time window having a predefined duration (shown in the FIG. 5 as being Z seconds, where the value of Z can be set accordingly). In one example Z is 30 seconds. When the first embodiment and the second embodiment described herein are combined, the value of Z may be less than the duration of the time window commenced at step S406.

Step S512 may be performed in a number of ways. In one example, at step S512 the CPU 202 may control a counter i1, which may be internal or external to the CPU 202, to start counting. It will be appreciated that this counter may count incrementally or decrementally. In another example, at step S512 the CPU 202 may start monitoring a real time clock that always runs and using the real time clock to monitor the first time window.

Upon determining that the first time window has expired at step S516 (e.g. the counter i1 has reached a threshold value of Z), the process 500 proceeds to step S518 where the CPU 202 activates the active reflected wave detector 206 so that it is in an activated state and operable to measure wave reflections from the environment.

At step S520, after the reactivating, the CPU 202 uses the output of the active reflected wave detector to classify a second status of the person as being in a fall position or a non-fall position.

If the CPU 202 classifies the second status of the person detected in the environment as being in a fall position at step S520 (determined at step S522), at step S524 the CPU 202 issues a fall detection alert or notification.

Thus it can be seen that assuming the person is classified as being in a fall position at step S508, the CPU 202 then waits predetermined amount of time (Z secs) and then reclassifies (at step S520) to see if the person is still in the same position, and if so determines that there is a person in a fall condition (because they have been in a fall position for some amount of time deemed to indicate they may need help), and issues an alert. Embodiments of the present disclosure, advantageously conserve energy by switching the active reflected wave detector 206 to a lower power state (e.g. off or asleep) between the reflected wave measurements performed by the active reflected wave detector 206.

The issuance of the fall detection alert at step S524 may be performed in various ways. For example the CPU 202 may transmit an alert message to a remote device (not shown in FIG. 1), which may be via a wireless connection. This remote device may for example be a mobile computing device (e.g. a tablet or smartphone) associated with a carer or relative. Alternatively the remote device may be a computing device in a remote location (e.g. a personal computer in a monitoring station). Alternatively the remote device may be a control hub in the environment 100 (e.g. a wall or table mounted control hub). The control hub may be a control hub of a system that may be monitoring system and/or may be a home automation system. The notification to the control hub is in some embodiments via wireless personal area network, e.g. a low-rate wireless personal area network. Alternatively or additionally the CPU 202 may control a visual output device (e.g. a light) on device 102 to output a visual alert of the fall detection. Alternatively or additionally the CPU 202 may control an audible output device (e.g. a speaker) on device 102 to output an audible alert of the fall detection.

As shown by optional step S514, in some embodiments, if a signal indicative of activity in the monitored space 104 of the environment is received from the activity sensor 204 during the first time window Z then the CPU 202 does not do perform the second classification at step S520. Rather, the process 500 returns to step S502, thereby only triggering an alarm if there is a first time window Z having at its start and end, respective fall position determinations, and with no movement detected therebetween by the (separate and low power) activity sensor 204.

Whilst FIG. 5a illustrates a single subsequent reclassification of the person's status in the environment (at step S520), it will be appreciated that multiple reclassification of the person as being in a fall position may be required before the fall detection alert is issued at step S524. Optionally, in addition to steps S508 and S522, a third status determination may be made after S522 after the passing of another time window, which may for example have the same duration as the first time window Z. If the person is determined to be in a fall position for all three status determinations, then a fall detection alert may be issued. The/each off/inactive period between on/active periods may be longer than on/active period required to make each status determination. However, using just two status determinations (at steps S508 and S522), with an off/inactive period in between them, has an advantage of involving the minimum usage of the active reflected wave detector 206 over the time window and therefore saves the most power. A person may rise from the fall position between the on/active states, and such rising will therefore not be detected. However, identifying that the person is detected in fall positions at least at the start and end points of a time window may be sufficiently indicative of the person being in a condition for which they may need assistance while balancing the potential for false alarms.

In the second embodiment, in response to determining at step S508 that the person is in a fall position, the time window is used to trigger a further classification of the person's state to check that the person is still in the fall position (i.e. they have been unable to get up from the floor). The device 102 need not detect all cases that the person has fallen—for example if a person has fallen and gotten up quickly thereafter so it isn't detected, it doesn't matter, because the person is not immobile on the floor. As noted above, the CPU 202 may be able to classify the person as crawling, which may be regarded as a fall position or a non-fall position (given that if the person has fallen the person is still able to move so may be regarded as less critical) dependent on how the CPU 202 is configured. In embodiments where the optional step S514 is used, a person crawling may be considered as being in a fall position since they may be mobile (crawling) only at the moment when the classification status occurred. If they are thereafter immobile, step S514 may give a negative result, thus enabling a fall condition determination at step S516. In other embodiments in which step S514 is used, a crawling state (which implies a crawling position) may be considered as being as a non-fall position.

In response to determining at step S508 that the person is in a non-fall position, an additional classification using the output of the active reflected wave detector 206 is not needed to arrive at the conclusion that the person is in a non-fall position. This will be described in more detail below.

A first implementation of the second embodiment is described with reference to FIG. 5b in which the activity sensor 204 is used.

Referring back to step S508, in response to the person being classified as being in a non-fall position at step S508, at step S526 the active reflected wave detector 206 is deactivated. Whilst step S526 is shown as being performed after step S508 this need not be the case, the deactivation merely has to happen after the relevant data needed for the classifying (at step S506) is received. At step S528 the CPU 202 commences a second time window having a predefined duration (shown in the FIG. 5b as being Y secs, where the value of Y can be set accordingly). The value of Y may be the same as Z, however the values of Y and Z could be different. When the first embodiment and the second embodiment described herein are combined, the value of Y may be the same as (or different to) the duration of the time window commenced at step S406.

Step S528 may be performed in a number of ways. In one example, at step S528 the CPU 202 may control a counter i2, which may be internal or external to the CPU 202, to start counting. It will be appreciated that this counter may count incrementally or decrementally. In another example, at step S528 the CPU 202 may start monitoring a real time clock that always runs and using the real time clock to monitor the second time window.

Upon determining that the second time window has expired at step S532 (e.g. the counter i2 has reached the threshold value of Y) during which the CPU 202 does not receive a signal indicative of activity in the environment from the activity sensor 204, the process 500 proceeds back to step S502 (shown in FIG. 5a) where the CPU 202 activates the active reflected wave detector 206 so that it is in an activated state and operable to measure wave reflections from the environment.

If, at step S530, the CPU 202 receives a signal indicative of activity in the environment from the activity sensor 204 before expiry of the second time window Y the process 500 proceeds to step S534, where the CPU 202 commences a third time window having a predefined duration (shown in the FIG. 5b as being X seconds, where the value of X can be set accordingly). The value of X may be the same as Y, however the values of X and Y could be different. When the first embodiment and the second embodiment described herein are combined, the value of X may be the same as (or different to) the duration of the time window commenced at step S406.

At step S534, the CPU 202 awaits expiry of the third time window X in which no further activity detections (e.g. motion detections) have occurred before proceeding back to step S502 (shown in FIG. 5a) where the CPU 202 activates the active reflected wave detector 206 so that it is in an activated state and operable to measure wave reflections from the environment.

Thus it can be seen from FIG. 5b that if the initial classification (at step S506) determined the person was in a non-fall state, which may for example be standing (or may merely be a non-fall state), then if there is no detected activity by the activity sensor 204 after a second time window Y (which may advantageously be more than the first time window Z, since the person was not identified as being in a positionally dangerous position), then the process 500 activates the active reflected wave detector 206 and returns to the first classification step (step S506)—with the radar being off during that in-between time period. On the other hand if activity (e.g. motion) is detected by the low-power activity sensor 204 during the second time window Y, the person is at the lower level of risk of all, so the system returns to waiting for a third time window X where the CPU 202 waits for the activity sensor 202 to stop detecting activity for a sufficient amount of time to justify activating the active reflected wave detector 206 again.

In the first implementation of the second embodiment, if the CPU 202 classifies the second status of the person detected in the environment as being in a non-fall position at step S520 (determined at step S522), the process proceeds to step 526 where the active reflected wave detector 206 is deactivated. Whilst step S526 is shown as being performed after step S522 this need not be the case, the deactivation merely has to happen after the relevant data needed for the classifying (at step S520) is received. Thus the process 500 proceeds to step S526 if the first status is that the person is in a non-fall position (determined at step S508) or the second status is that the person is in a non-fall position (determined at step S522).

III. Aborting a Reflective Wave Measurement Process

Figure 6:
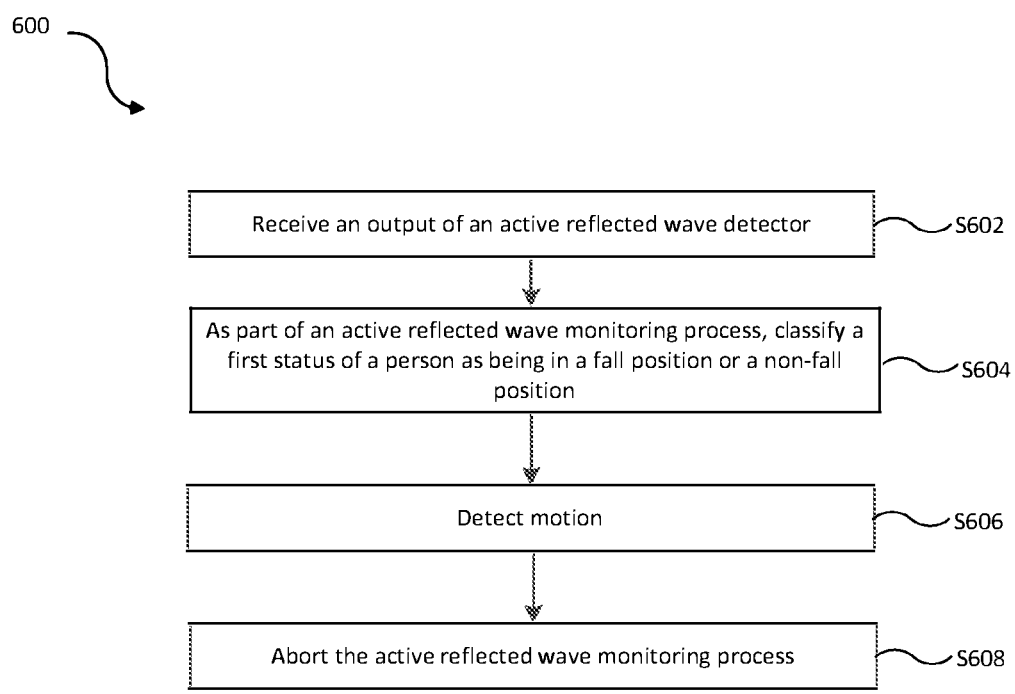
FIG. 6 illustrates a process for determining a status of an environment and/or of a person therein in accordance with a third embodiment of the present disclosure.

We now describe a third embodiment of the present disclosure with reference to FIG. 6 which illustrates a process 600 performed by the CPU 202 for determining a condition of a person in an environment.

In the third embodiment an active reflective wave measurement process is used to determine a condition of a person in an environment, and this active reflective wave measurement process is aborted in response to detecting a motion event satisfying at least one predefined criterion in order to conserve power.

As described in more detail below, in the third embodiment, the activity sensor 204 is optional and may not be present in the device 102.

The active reflective wave measurement process being aborted could comprise a process in which the active reflected wave detector 206 is waiting to wake-up to take another measurement once a time window expires. In another embodiment the active reflected wave detector 206 does not go to sleep in the first place (there is no window in which its power is turned off). In particular, the active reflective wave measurement process being aborted may be the process 500 described above with reference to the second embodiment, however this is not essential and the the active reflective wave measurement process may be any process in which the output of an active reflected wave detector is used to determine a condition of a person in an environment.

It should be noted that when the process 600 is started, the active reflected wave detector 206 is in an activated state operable to measure wave reflections from the environment.

At step S602, the CPU 202 receives an output from the active reflected wave detector 206 that is indicative of one or more of the measured wave reflections.

At step S604, the CPU 202 classifies a first status of a person detected in the environment as being in a fall position or a non-fall position, based on an output of the active reflected wave detector 206.

Once the CPU 202 has received all of the relevant data needed for the classifying (at step S604) the CPU 202 may deactivate the active reflected wave detector 206. In other embodiments, the active reflected wave detector 206 remains active and continues to supply data of measured wave reflections from the environment to the CPU 202 until the classification result is determined.

At step S606, the CPU 202 detects motion associated with the person in the environment that satisfies at least one predefined criterion. The CPU 202 may detect the motion based on an output from the active reflected wave detector

206. For example, at step S606 the CPU may detect that the person's motion exceeds a predefined velocity and/or displacement based on processing the output from the active reflected wave detector 206. If the device 102 comprises an activity sensor 204 in the form of a motion detector (e.g. a PIR detector, which comprises a PIR sensor), the CPU 202 may detect the motion based on an output from the motion detector that is indicative of motion being detected (the criterion being the conditions upon which the PIR detector motion). In another example, the CPU 202 may detect the motion based on the device 102 receiving a motion detection message from a remote device.

At step S608, the CPU 202 aborts the active reflective wave measurement process in response to the motion detected at step S606.

The third embodiment is advantageous in that there is a saving of power that would have been otherwise consumed by way of active reflected wave measurements performed in the the active reflective wave measurement process should there have been no motion detected. If the first status determined at step S604 is that the person is in a fall position, after aborting the active reflected wave monitoring process, the active reflected wave monitoring process may be restarted. The restarting of the active reflected wave monitoring process may be restarted after a predetermined amount of delay (e.g. 15-30 seconds) after the motion detection event, or the restarting of the active reflected wave monitoring process may be immediate.

If the first status determined at step S604 is that the person is in a non-fall position, after aborting the active reflected wave monitoring process, the active reflected wave monitoring process may, in some embodiments, be terminated without restarting. This is because if the person is in a non-fall state the PIR sensor can be relied upon to detect motion if they fall to the floor, so advantageously the active reflected wave monitoring process (in which power consumption intensive active wave measurements are performed by the active reflected wave detector 206) does not need to be restarted.

By way of example only, we describe how the third embodiment may be applied to the the process 500 described above with reference to the second embodiment.

In particular, step S604 may correspond to step S508 and in the event that the first status is that the person is in a fall position, step S606 may correspond to a positive determination that motion has been detected at S514. In this example, aborting the active reflected wave monitoring process advantageously prevents the reactivation of the active reflected wave detector (at step S518) and reclassification of the status of the person as being in a fall position or a non-fall position (at step 520) which could result in a power consuming task of issuing of a fall detection alert (at step S524). Further unnecessary issuing of alerts/notifications can result in transmission collisions and/or can increase load on the device that needs to receive and handle the alert/notification. Further in cases where the abortion of the process delays or aborts a next operation of the active reflected wave detector that can also save significant power.

In this example, the active reflected wave monitoring process 500 is aborted, and the active reflected wave monitoring process 500 is restarted (see 'Yes' arrow from step S514 to step S502 in FIG. 5*a*). As noted above, the restarting of the active reflected wave monitoring process 500 may be restarted after a predetermined amount of delay thus the CPU 202 may wait for expiry of a time window having a predefined duration of P seconds (where the value of P can be set accordingly) in which no motion is detected by the motion detector 204 before proceeding going back to step S502 and restarting the active reflected wave monitoring process 500. Preferably the timing window of P seconds is shorter than the third time window of X seconds (used at step S534, S550, and S570 when the first status of the person was that they were in a non-fall state) because it is advantageous that the monitoring to be more responsive if the person were detected in a fall position since its already potentially a safety concern.

In another example, step S604 may correspond to step S508 and in the event that the first status is that the person is in a non-fall position, step S606 may correspond to a positive determination that motion has been detected at any of steps S530, S546, and S570. In this example, aborting the active reflected wave monitoring process prevents the process 500 proceeding to step S502 whereby the active reflected wave detector is reactivated after a predetermined amount of time has elapsed. In this example, the active reflected wave monitoring process 500 is aborted, and the active reflected wave monitoring process 500 is not restarted. Instead, after the active reflected wave monitoring process 500 has been aborted, the active reflected wave detector 206 remains deactivated and the CPU 202 may perform process 400 for determining a status of an environment and/or of a person therein, which as described above, relies on the activity sensor 204 (e.g. motion detector) to detect motion before triggering the more power consuming active reflected wave detector 206. This leverages the idea that if there is movement that meets the criteria that the person's condition is not critical the power intensive active reflected wave monitoring process can be aborted as the person is, after all, still moving.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In addition, any priority document(s) of this application is/are hereby incorporated herein by reference in its/their entirety.

What is claimed is:

1. A fall detector device for mounting on a vertical wall for monitoring an environment, comprising:
   a motion sensor for detecting motion of a person within a first field of view of the motion sensor;
   an active reflective wave sensor for detecting the presence of a person within a second field of view of the active reflective wave sensor using wave reflections from the environment, the first and second fields of views at least partially overlapping one another;
   a housing for mounting on the vertical wall, wherein the housing houses both the motion sensor and the active reflected wave detector, and
   a processor coupled to the motion sensor and active reflective wave sensor for receiving output from each of the motion sensor and active reflective wave sensor,
   wherein operation of the active reflective wave sensor is dependent on a detection of motion of a person within at least a portion of the first field of view by the motion sensor, and
   wherein at least one boundary of the second field of view extends more vertically downwards than a lower boundary of the first field of view.

2. A fall detector device according to claim 1, wherein the second field of view is greater than the at least a portion of the first field of view.

3. A fall detector device according to claim 1, wherein the at least a portion of the first field of view comprises an area of the first field of view that overlaps the second field of view.

4. A fall detector device according to claim 1, wherein the at least a portion of the first field of view comprises an area within the first field of view below a predefined vertical height relative to a position of the device when mounted on the vertical wall.

5. A fall detector device according to claim 1, wherein operation of the active reflective wave sensor is activated upon expiry of a time window that commences in response to the motion sensor detecting motion of a person.

6. A fall detector device according to claim 5, wherein the processor is configured to:
determine a status of the environment and/or of a person therein based on an output received from the active reflected wave sensor that is indicative of one or more of the measured wave reflections,
wherein the processor delays expiry of the time window in response to the motion sensor detecting activity in the environment during the time window.

7. A fall detector device according to claim 5, wherein the device commences a fall detection in response to detecting a presence of a person, the detecting of the person being based on an output of the active reflective wave sensor.

8. A fall detector device according to claim 1, wherein operation of the active reflective wave sensor is triggered when the motion sensor detects motion of a person.

9. A fall detector device according to claim 1, wherein the motion sensor is positioned vertically above the active reflective wave sensor when mounted on the vertical wall.

10. A fall detector device according to claim 1, wherein the motion sensor is positioned vertically below the active reflective wave sensor when mounted on the vertical wall, and wherein the active reflective wave sensor is arranged to protrude horizontally beyond the motion sensor.

11. A fall detector device according to claim 1, wherein the motion sensor comprises a Passive InfraRed (PIR) sensor.

12. A fall detector device according to claim 1, wherein the active reflective wave sensor comprises a radar sensor.

13. A fall detector device according to claim 12, wherein the radar sensor senses identifies 3-dimensional coordinates of received reflected waves.

14. A fall detector device according to claim 13, wherein the device uses the coordinates to identify the person as being in fallen condition.

15. A fall detector device according to claim 14, wherein the device identifies the person as being in a fall condition by comparing the 3-dimensional coordinates of received reflected waves and training data, the training data including:
for cases in which a person is in a fall position, 3-dimensional coordinates at which waves from the or one or more other active reflected wave sensors were reflected to the or the one or more other active reflected wave sensor, respectively.

16. A fall detector device according to claim 14, wherein the device identifies the person as being in a fall position based on height metric based on 3-dimensional coordinates at which waves from the active reflected wave sensor were reflected to the active reflected wave sensor that are within a threshold distance from a floor.

17. A fall detector device according to claim 1, wherein the at least one boundary of the second field of view extends substantially vertically below the fall detector device so that the active reflective wave sensor can detect a person who has moved outside of the first field of view of the motion sensor and into a range of distances most proximal to the device.

18. A fall detector device according to claim 1, wherein the second field of view extends substantially vertically below the device, wherein said extending of the at least one boundary of the second field of view being more vertically downwards than a lower boundary of the first field of view enables a person in a fall condition to be detected by the active reflective wave sensor even if they move outside of the field of view of the motion sensor at least when their movement is from directly forward of the device in a direction towards and vertically below the active reflective wave sensor.

19. A fall detector device according to claim 18, wherein the second field of view extends substantially vertically below the device.

20. A fall detector device according to claim 1, wherein said extending of the at least one boundary of the second field of view being more vertically downwards than a lower boundary of the first field of view is such that a person, falling into distances from the device that are more proximal to the device than distances detectable by the motion sensor, is detected by the active reflective wave sensor when the active reflective wave sensor is triggered into operation because of a previous detection by the motion sensor.

* * * * *